Figure 1:
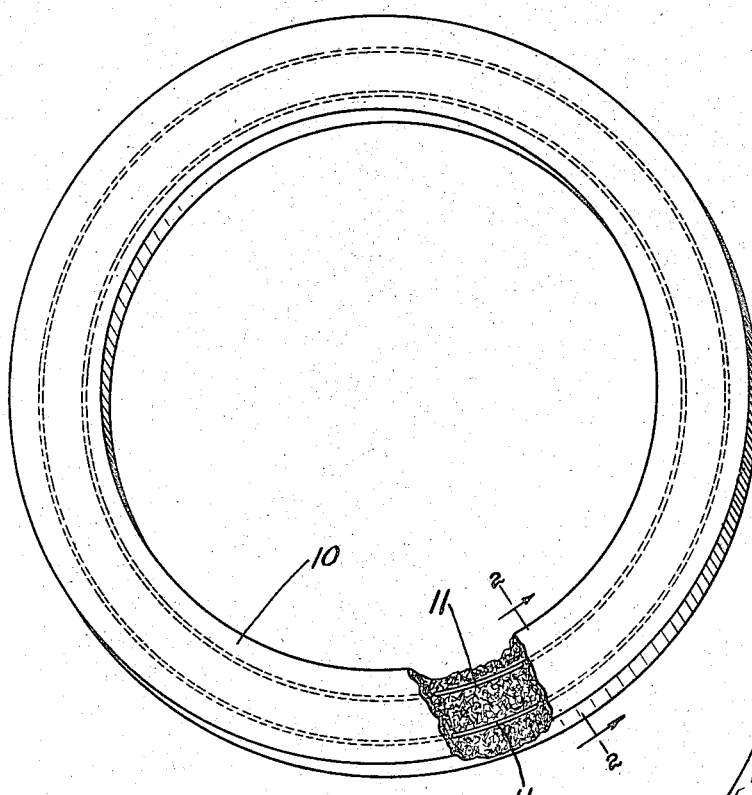

UNITED STATES PATENT OFFICE.

SUMNER SIMPSON, OF BRIDGEPORT, CONNECTICUT, ASSIGNOR TO THE RAYBESTOS COMPANY, OF BRIDGEPORT, CONNECTICUT, A CORPORATION OF CONNECTICUT.

CLUTCH-FACING.

1,281,219.   Specification of Letters Patent.   Patented Oct. 8, 1918.

Application filed February 17, 1917, Serial No. 149,267. Renewed September 11, 1918. Serial No. 253,648.

*To all whom it may concern:*

Be it known that I, SUMNER SIMPSON, a citizen of the United States, residing at Bridgeport, county of Fairfield, State of Connecticut, have invented an Improvement in Clutch-Facings, of which the following is a specification.

This invention relates to the production of clutch facings, with more particular reference to the various types of automobile clutches. It is well known that there are two highly important qualities which, on account of the nature of the work they are called upon to perform, should be possessed by clutch facings in general. First, they should obviously have a high coefficient of friction, and, second, having a high coefficient of friction and being constantly subjected when in use to powerful abrasive forces, and being necessarily yielding, they should be exceedingly tough in order to withstand for a reasonably long time the excessive wearing strains of use. Particularly in the case of an automobile clutch, the replacing of the clutch rings in a laborious and expensive operation, and every effort has been made to produce these rings from material having a requisitely high coefficient of friction and which will withstand the strains of use for the longest possible period of time.

It will be apparent, however, that in addition and incident to the two essential qualities mentioned above, in view of the heat which is produced by the friction, clutch rings or facings should be constructed of material capable of being brought to high temperatures without either physical or chemical change thereof, and on this account asbestos has been generally employed as the base for clutch-ring material, for asbestos is not only well known to be a substance which is capable of withstanding high temperatures without chemical or physical change, but it also possesses the requisitely high coefficient of friction and comparatively good wearing qualities.

In the mining of asbestos, the mine run includes relatively long fibers, known as crude asbestos, the only part of the run that can be used for spinning, and relatively short fibers, known as fiber-asbestos, which cannot be spun. In approved present known processes, the crude asbestos is shipped to the spinning mill, where it is crushed, opened, carded, roved and spun, and then twisted around a metallic core, usually small-gage brass or copper wire, in as many plies as may be required by the particular one of the various purposes for which this yarn is adapted. This yarn is then woven into what may be termed a tape of the desired width and thickness, and of any convenient length, from which is cut rings of the desired inside and outside diameter which are then chemically treated and baked at a proper temperature to make the same coherent, tough, relatively hard and caused to possess the desired coefficient of friction.

With respect to this old process, it will be noted, first, that only a certain selective part of the mined asbestos can be employed—that is to say, the crude or long-fiber asbestos—and second, that the spinning of these long fibers, into a filament, the twisting of this filament around the metallic core to form reinforced metallic yarn, the weaving of this yarn into fabric, the cutting of this reinforced fabric into rings of the proper dimensions, and the treating and baking of these rings, constitutes a somewhat elaborate, complex and necessarily expensive process, the product of which at best is far from perfect. That the product is defective is due to two principal causes; first, because in forming, treating and pressing rings of woven fabric it is absolutely impossible, under any known method, to produce a ring which will hold correct inside and outside diameters and uniform thickness—even assuming that a ring of woven material can be originally formed and compressed to an exact size, which experience has demonstrated to be a practical impossibility—and, second, because woven fabric, however treated, is always subject to a tendency to ravel, particularly after having been worn to a certain extent.

The present invention has in view the production of asbestos-base clutch rings, in which carding, roving, spinning, twisting and weaving of the raw material is entirely dispensed with, in which the short-fiber asbestos of the mine run may be utilized, which shall be not only of originally substantially uniform predetermined dimensions and contour, but of a character to preserve the original size, contour, homogeneity and other qualities and characteristics throughout long-continued use thereof.

Figure 2:
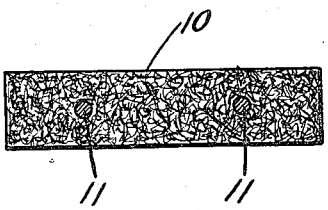
Figure 3:
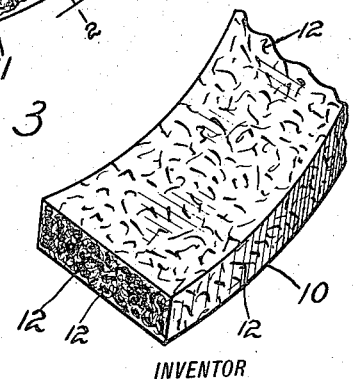

In the accompanying drawing forming a part of this specification,

Figure 1 is a perspective view of a clutch facing, embodying the present invention, partly broken away;

Fig. 2 a section on an enlarged scale on the line 2—2, in Fig. 1, looking in the direction of the arrows; and Fig. 3 is a sectional perspective view illustrating a variant form of the invention.

10 denotes the body of my novel clutch facing which is a solid homogeneous mass of asbestos fiber cohering through a suitable binder, 11 wire rings embedded in the mass, and in Fig. 3, 12 denotes short lengths of wire indiscriminately dispersed throughout the mass.

In the production of my novel clutch facings I take the short-fiber asbestos stock from the mines, mix the same by any approved process of saturation with a suitable liquid binder or binding compound, mold the same under compression to the desired form and size and thoroughly dry the same either in the air or by passing it through a suitable oven. In this manner, not only am I enabled to utilize what is known as low-grade asbestos fiber, but to produce clutch rings which experiments have demonstrated will wear longer, give much better results and be more efficient in every way than the woven endless or joined rings or facings. Furthermore, by molding under compression a ring or facing from a homogeneous mass of plastic material, the manufacture is carried on without the excessive waste of material, which cannot be avoided under present methods of cutting these rings from woven fabric. Still furthermore, it will be apparent that in mixing the materials to produce the plastic mass from which the rings are molded, I am enabled to insure saturation of the asbestos fiber with the binding material to a much more nearly perfect degree than is possible in the attempted saturation of formed rings cut from woven fabric.

I may still further improve the product by incorporating in the plastic compound prior to compression metal wire, preferably copper or brass wire which may be in the form of rings, or a woven mesh or short lengths of wire may be indiscriminately dispersed throughout the mass. This metallic reinforcement imparts to the finished rings additional strength, rigidity and toughness.

It is required that the fibers and the binder be thoroughly commingled or amalgamated through any preferred manner of agitation in a suitable container for such period of time as may be required to insure complete saturation of the fibers, and that after molding the rings be thoroughly dried, ordinarily in a heated oven.

The proportions of the ingredients to be employed is a matter of individual judgment. The ultimate object is to produce a solid homogeneous body in which the fiber predominates. Therefore, just enough of the binding liquid should be employed to saturate the fiber to an extent which insures substantial solidity and homogeneity under compression.

Uniform density is a matter of prime consideration in the production of these rings, for if the density varies the effects of wearing will be unevenly distributed and thus tend to shorten the useful life of the product. By saturating and thoroughly intermingling the fibers prior to compression of the same to the desired annular form, much more nearly perfect uniform density of the mass of the finished product is insured.

I might also mention that in all asbestos yarn as now manufactured, the use of a certain amount of cotton is necessary in order that the asbestos fibers may be "picked up" and carried over the card. The existence of even a comparatively small amount of cotton in clutch-ring material is manifestly objectionable, but its presence therein has been necessitated in the manufacture of rings from woven asbestos. It will be noted that in carrying out my present invention the use of cotton or an equivalent thereof is wholly unnecessary.

The binder or binding compound to which I have referred may consist of various vegetable oils or gums, or mineral oils or gums, or any derivative of either or combination of both. Asphaltic compounds may also be employed, or any one of various organic or inorganic solutions of primarily viscous and subsequently hardening character, in brief any substance that will not only effect the desired cohesion between the fibers but also be water-proof and oil-proof, and possess the essential heat and wear resisting qualities.

It may be that there are fibrous materials other than asbestos which might form the base of a material adapted to be used as a clutch ring or facing, such substitutive fibrous material being either vegetable or mineral. In the foregoing specification I have specified asbestos fibers as a preferred base for the material of my improved clutch ring on account of its proven and recognized heat and wear-resisting qualities and its comparatively high coefficient of friction.

I claim as new and desire to secure by Letters Patent:

1. A clutch facing comprising a solid, homogeneous, annular body formed of asbestos fibers cohering through a suitable binder.

2. A clutch facing comprising a solid, homogeneous, annular body formed of asbestos fibers cohering through a suitable binder, and having a reinforcement of metallic wire embedded in the material thereof.

In testimony whereof I affix my signature.

SUMNER SIMPSON.